United States Patent Office 3,072,790
Patented Jan. 8, 1963

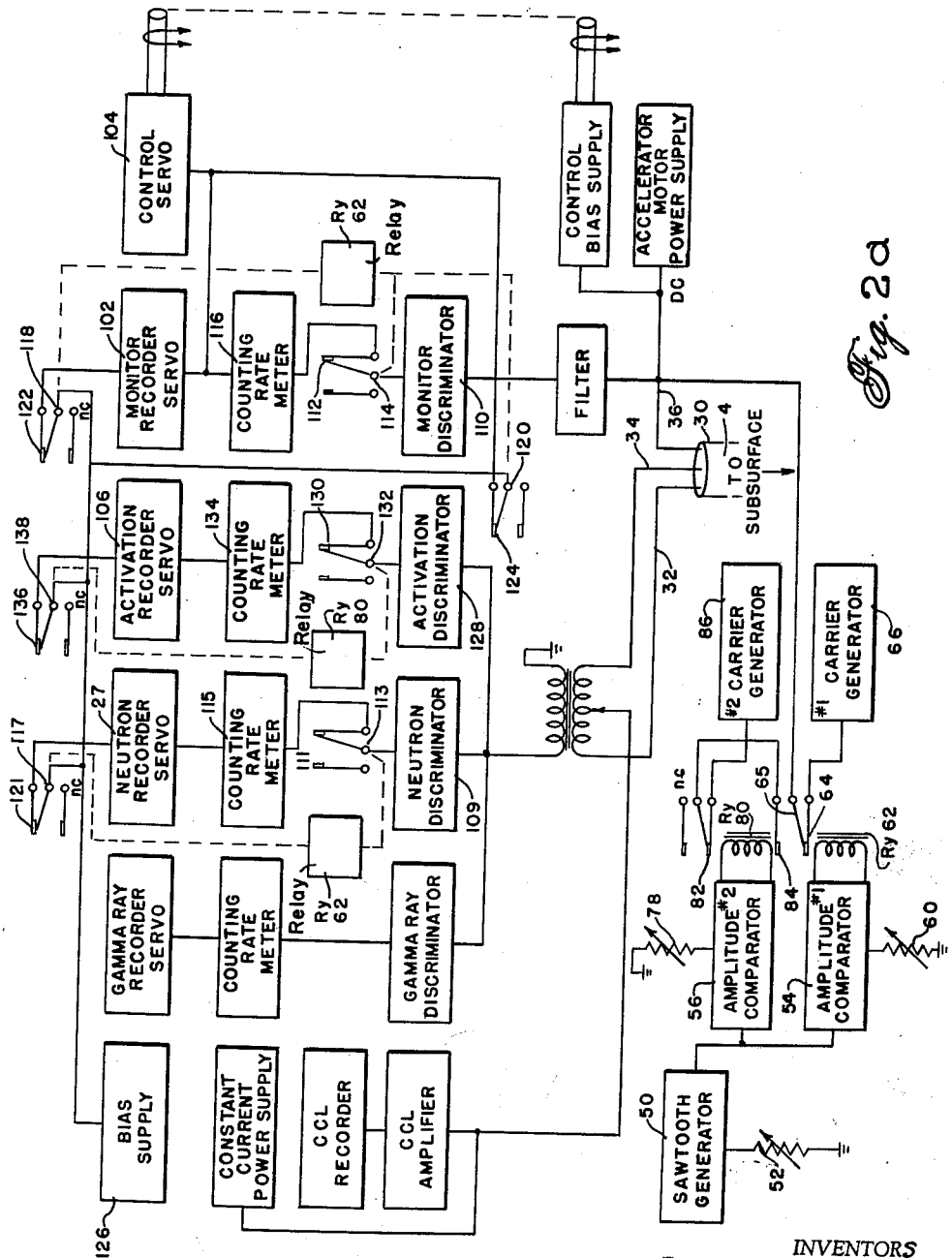

3,072,790
APPARATUS FOR CYCLIC ACTIVATION LOGGING
Eric C. Hopkinson, Tulsa, Okla., and Robert L. Tucker, Dallas, Tex., assignors to Well Surveys, Incorporated, a corporation of Delaware
Filed Mar. 13, 1959, Ser. No. 799,337
9 Claims. (Cl. 250—83.3)

This invention relates to nuclear well logging systems and is particularly directed to novel apparatus for nuclear well logging including an accelerator type neutron source and means for cyclically operating said source and the associated apparatus.

In the art of nuclear well logging, a subsurface instrument housing a source of radiation, such as neutrons, and a suitable radiation detector is suspended in a borehole to be logged by means of a cable which also serves to transmit electrical signals between the subsurface instrument and suitable surface equipment. During logging operations, the subsurface instrument is traversed through the borehole and the source is caused to irradiate the formations surrounding the borehole with neutrons while the detector observes the effect of the interactions of the neutrons with the formations.

Some information concerning the lithologic and petrologic characteristics of the formations can be obtained by detecting and measuring the instantaneous effects of the neutron irradiation. Thus, by measuring neutrons scattered in the formations and returned to the borehole, or gamma rays which are emitted in the formations as a result of neutron bombardment, information concerning the porosity of the formations can be obtained. Moreover, if a source of high energy neutrons is carried by the source, some elements in the formations can be made artificially radioactive. The radiations emitted by these elements may then be detected and considerable information can be obtained which is not otherwise available. For example, oxygen can be activated in this way and has a half-life of about seven seconds during which it emits gamma rays of about 6 mev. This is called "activation logging."

Unfortunately, some instantaneous gamma rays have energies comparable with this. Consequently, the detector cannot normally distinguish between the oxygen gamma rays and the instantaneous gamma rays and, unless some steps are taken, the activation information will be obscured. In the past, it has been proposed to overcome this problem by providing a spacing between the source and the detector which is sufficiently long so that the detector does not observe the instantaneous effects. Spacings as great as six to ten feet have been employed. However, since the instrument is normally moved through the well at speeds of less than 30 feet per minute, any oxygen activation would have seriously decayed before the detector was moved into a position to observe it. Consequently, the counting rate would be lower and the accuracy of the activation measurement poorer.

These disadvantages of prior art activation well logging systems may be overcome by employing the cyclic activation method taught by Arthur H. Youmans in his co-pending application, Serial No. 834,710, filed August 19, 1959. The present invention is directed to novel apparatus for accomplishing this method. Accordingly, novel means are provided which make it possible to reduce the source to detector spacing to a third or less of the prior art spacing. Consequently, the detector will be moved into position to observe the irradiated formations in a third or less of the time required with prior art instruments. Moreover, the shorter spacing permits the instrument to be made shorter which considerably reduces the weight of the instrument and makes it easier to handle. Furthermore, with the present invention, the instantaneous effects are virtually eliminated from the activation log. Consequently, the activation effects can be measured much more accurately and interpreted with greatly improved reliability.

The advantages of the present invention are preferably attained by providing an activation well logging system including an accelerator type neutron source together with novel means for cyclically energizing and de-energizing the source and detector so that the source irradiates the formations during alternate periods. The detector may then be made to observe the formations only during those periods when the source is not irradiating to make an accurate activation log or, if desired, the detector may be made to observe the formations continuously in which case it will make a conventional neutron log during periods when the source is irradiating the formations and will make an activation log during periods when the source is not irradiating. In the alternative, a separate neutron detector may be provided to make a conventional neutron log while the source is irradiating.

Accordingly, it is an object of the present invention to provide novel means for activation well logging which permits more accurate and reliable activation logging.

Another object of the present invention is to provide novel means for activation well logging which virtually eliminates instantaneous effects of irradiation.

A further object of the present invention is to provide novel means for activation well logging which permits the source to detector spacing to be greatly reduced.

A specific object of the present invention is to provide novel means for activation well logging comprising an accelerator type neutron source, a radiation detector, means for cyclically energizing and de-energizing said source to cause said source to irradiate the formations surrounding the borehole during alternate periods, and means for causing said detector to detect radiations from said formations during a predetermined portion of the cycle of operation of said source.

These and other objects and features of the present invention will be apparent from the following detailed description wherein reference is made to the figures of the accompanying drawings.

In the drawings:

FIG. 2a is a diagrammatic representation of the electronic circuitry of the surface apparatus of FIG. 1.

Figure 1:
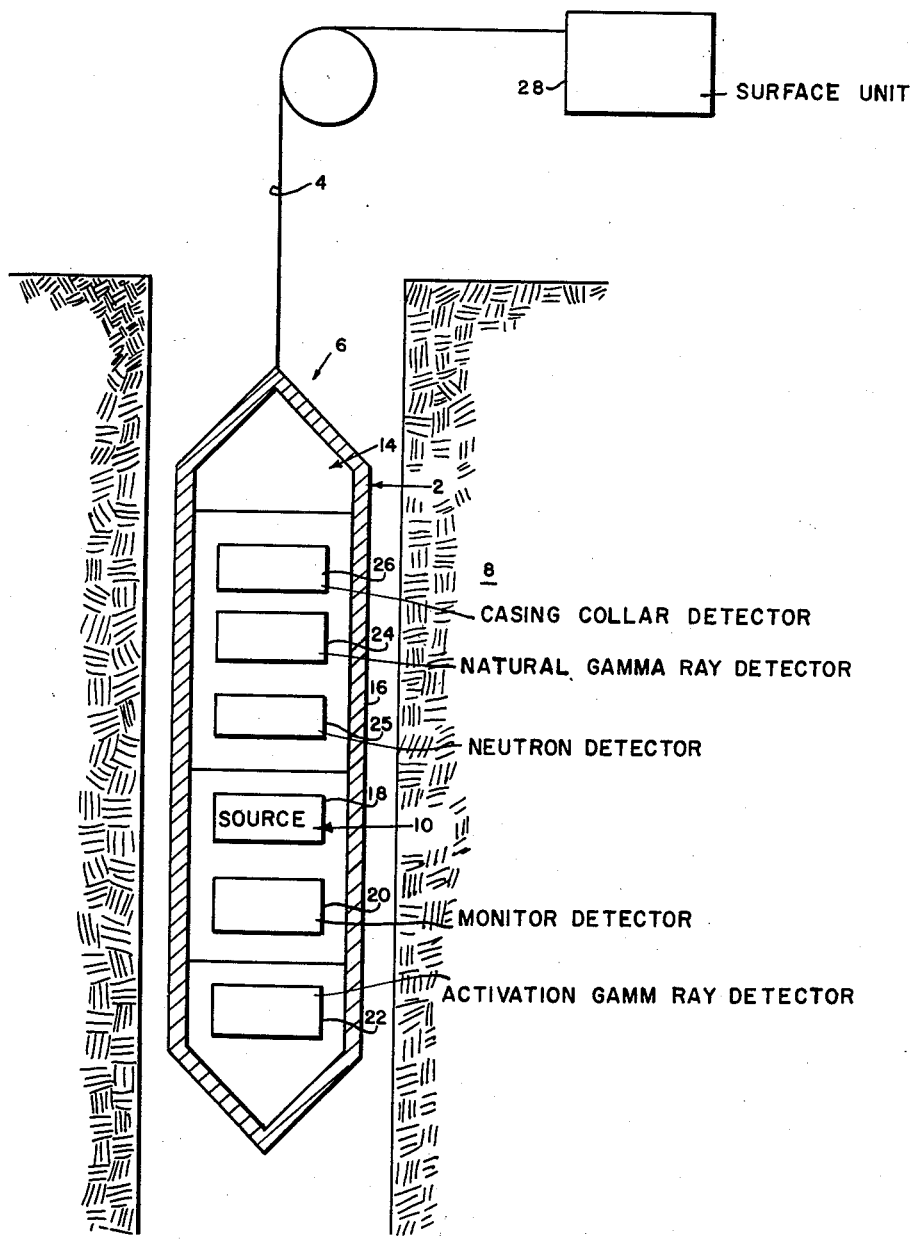
FIG. 1 is a view, partly in section, showing typical nuclear well logging apparatus embodying the present invention.
Figure 2B:
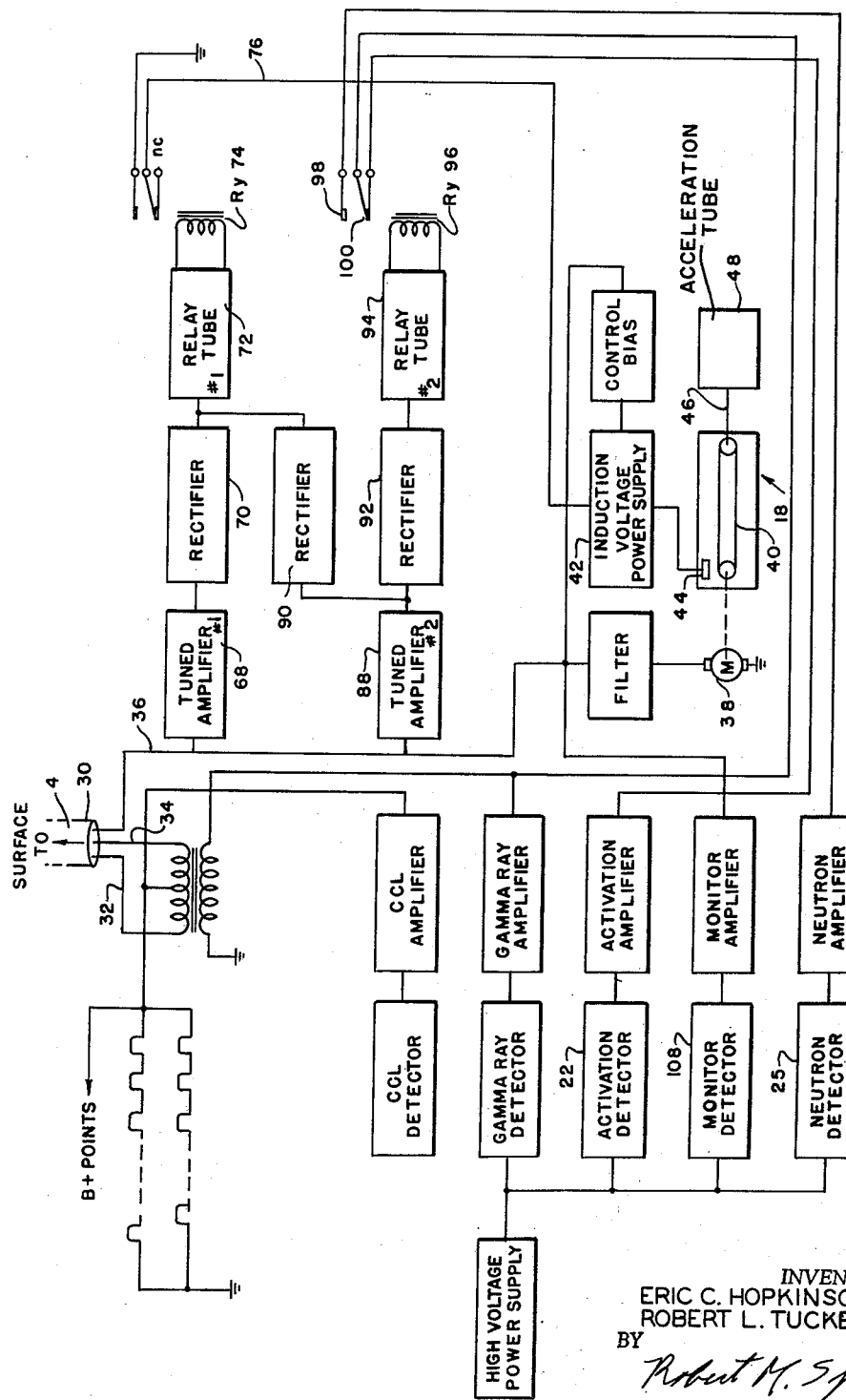
FIG. 2b is a diagrammatic representation of the electronic circuitry of the subsurface apparatus of FIG. 1.

In that form of the invention chosen for purposes of illustration in the drawings, FIG. 1 shows a subsurface instrument 2 suspended by means of a cable 4 in a borehole 6 which penetrates the earth 8. The subsurface instrument 2 comprises a source portion 10, a plurality of detectors and an electronic portion 14 all enclosed within a suitable pressure resistant housing 16. The source portion 10 of the subsurface instrument 2 preferably contains an accelerator type neutron source 18 and a monitor detector 20 while the detectors employed may comprise an activation gamma ray detector 22, a natural gamma ray detector 24, a neutron detector 25, and a casing collar detector 26. The electronic portion 14 contains various electronic components for energizing the source and detector portions and for processing signals from the various detectors and impressing the signals on the cable 4 for transmission to a surface unit 28. FIG. 2 illustrates the electronic circuitry of the apparatus of FIG. 1. However, to avoid crowding of the drawing, the surface circuitry is shown in FIG. 2a while the subsurface circuitry is shown in FIG. 2b. The circuits are connected by the cable 4 which appears in both FIGS. 2a and 2b. As seen in FIG. 2, the cable 4 preferably has an armored sheath 30 and at least three electrical conductors 32, 34, and 36 insulated from each other and from the sheath 30. The surface unit 28 includes suitable apparatus for receiving, processing and recording signals from the subsurface instrument 2 and for energizing and controlling the surface and subsurface equipment.

The signal transmission system employed in the present apparatus is substantially identical to that disclosed in the copending application of Robert L. Tucker, Serial No. 766,087, filed October 8, 1958, while the monitor control system for the accelerator source 18 is similar to that disclosed in the copending application of Eric C. Hopkinson, Serial No. 752,701, filed August 4, 1958, now abandoned. Accordingly, the components shown in FIG. 2 which relate exclusively to these portions of the circuitry are unnumbered.

As indicated above, the present invention comprises novel means for cyclically energizing and de-energizing the accelerator type neutron source 18 and activation gamma ray detector 22 to facilitate activation logging. FIG. 2b shows the neutron source 18 as a belt-type electrostatic generator having a motor 38 powered from the surface to drive an insulating belt 40 and an induction voltage supply 42 which applies a potential to induction plate 44 thereby inducing charges on the belt 40 which are carried to a high voltage electrode 46 to energize an acceleration tube 48 which serves as the neutron source. If the induction plate 44 is de-energized, no charge will be induced on the belt 40 and since the generator will produce no accelerating voltage no neutrons will be produced by the acceleration tube 48. Accordingly, by cyclically energizing and de-energizing the induction voltage supply 42, the neutron output can be pulsed to perform the cyclic activation logging method taught by Arthur H. Youmans in his aforementioned copending application.

As described more fully in Youman's application, it is desirable to provide a cycle of operation for the neutron source 18 and the activation detector 22 such that the source 18 is energized and irradiates the formations with neutrons during part of the cycle while the detector 22 is de-energized. After a time, the source 18 is turned off and, after a suitable delay, the activation detector 22 is energized to detect activation gamma rays. After a suitable period, the detector 22 is turned off and the source 18 is turned on to repeat the cycle. During those periods when the source 18 is turned on, detector 25 makes a conventional neutron log. Thus, in a 10 second cycle, the source might irradiate the formations for 5 seconds and then be turned off and, after a 0.5 second delay, the detector would be turned on and would detect for 4.5 seconds whereupon the detector would be turned off and the source would be turned on to repeat the cycle.

The 10 second cycle just described has been found in practice to be quite satisfactory. However, it may be desirable to employ a cycle of different duration or to vary the periods provided for irradation, delay and detection. To permit such flexibility of operation, a sawtooth wave generator 50 is provided in the surface unit and is preferably provided with suitable means 52 for varying the length of the cycle. The output of the sawtooth generator 50 is supplied to two amplitude comparator circuits 54 and 56 which are adjustable to determine the length of two portions of the cycle while the length of the third portion is that part of the cycle remaining. The comparator circuits 54 and 56 may be connected to control any desired portions of the cycle. However, as seen in FIG. 2, comparator circuit 54 controls the length of the delay period and comparator 56 controls the length of the detecting period while the irradiating period is that portion of the cycle not occupied by the other two.

At the start of the period, the source 18 is operating to irradiate the formations with neutrons and detector 25 is connected to make a conventional neutrol log while the signal from the sawtooth wave generator 50 is rising. When the wave reaches an amplitude, selected by adjusting means 60, comparator circuit 54 is triggered and energizes relay 62 to close contact 64 of switch 65 which allows a first carrier signal from first carrier generator 66 to be applied to conductor 36 of the cable 4. In the subsurface instrument 2, the first carrier is passed by tuned amplifier 68 to rectifier 70 and is applied to relay tube 72 which switches relay 74 and grounds conductor 76. This cuts off the induction voltage supply 42 and de-energizes induction plate 44 which prevents further charging of the high voltage electrode 46 and stops the operation of the source 18. At the same time, in the surface unit 28, relay 62 disconnects the neutron recorder 27, the monitor recorder 102 and the control servo 104 in a manner hereinafter described.

As the sawtooth wave continues to rise, a second amplitude is reached, determined by adjusting means 78. This triggers comparator circuit 56 which energizes relay 80 to close contact 82 and operates switch 65 to open contact 64 and close contact 84. It will be noted that switch 65 is operated by both relay 62 and relay 80. By doing this, first carrier generator 66 is disconnected from conductor 36 of cable 4 and a second carrier generator 86 is connected to transmit a second carrier over conductor 36 of the cable 4. In the subsurface instrument 2, the second carrier signal is blocked by tuned amplifier 68 but is passed by tuned amplifier 88 to rectifiers 90 and 92. Rectifier 90 passes the second carrier to relay tube 72 to continue holding the source 18 de-energized. At the same time, rectifier 92 passes the second carrier to relay tube 94 which controls relay 96 to open contact 98 and close contact 100. When contact 98 is closed, neutron detector 25 is connected to the cable 4 while activation detector 22 is disconnected from the cable 4. However, when contact 98 is opened and contact 100 is closed by the second carrier, the neutron detector 25 is disconnected from cable 4 and activation detector 22 is connected to transmit signals in a conventional manner. When the sawtooth wave reaches its maximum amplitude and then cuts off, the circuit resets itself to repeat these operations on the next cycle.

To summarize the operation of the system as thus far described, the cycle begins with the source 18 energized and irradiating the formations while detector 25 makes a conventional neutron log. During this period, the sawtooth wave emitted by generator 50 is rising. After a predetermined irradiating period, set by adjusting means 60, the sawtooth wave reaches an amplitude which triggers comparator circuit 54. This actuates relay 62 which disconnects neutron recorder 27 and applies a first carrier signal from first carrier generator 66 to conductor 36 of the cable 4 which carries the first carrier to the subsurface instrument 2 where it is applied to de-energize the source 18. The sawtooth wave continues to rise, and after a predetermined delay period, set by adjusting means 78, the sawtooth wave reaches an amplitude which triggers comparator circuit 56. This disconnects the first carrier generator 66 from conductor 36 of the table 4 and connects second carrier generator 86 to conductor 36 to send a second carrier signal down the cable 4 to the subsurface instrument 2. This second carrier continues to hold the source 18 de-energized and serves to disconnect the neutron detector 25 from the cable 4 and to connect activation detector 22 to the cable 4 so that signals from the activation detector 22 may be transmitted to the surface. Meanwhile, the sawtooth wave continues to rise until it reaches its cut-off point at which time the sawtooth wave amplitude returns to zero and the cycle starts to repeat.

In practice, it has been found that the system described above performs extremely well. However, absent the additional features of the present invention, when the source 18 is de-energized, the monitor recorder 102 pen and control servo 104 would return to their respective zero radiation positions. Moreover, when neutron recorder 27 is disconnected, its pen would return to the zero radiation position. Similarly, when the activation detector 22 is disconnected, the activation recorder 106 pen would also return to its zero radiation position. Unfortunately, when the source 18 is re-energized or when the activation detector 22 or neutron recorder 29 are reconnected, some time is required before the respective recorder pens reach their recording positions and much valuable information may be lost during this "rise time." On the other hand, if the recorder pens are held in the positions indicating the last received information during the portions of the cycle when their respective circuits are inoperative and until new information is received, the "rise time" losses can be virtually eliminated.

Such holding can easily be accomplished, as shown in FIG. 2. As stated previously, the source 18 is irradiating the formations at the beginning of the cycle. Simultaneously, neutron detector 25 is making a conventional neutron log and is supplying a signal which is transmitted up the cable 4 to the neutron discriminator 109 in the surface unit 28. This signal is passed through contact 111 of switch 113 to a counting rate meter 115 and is then supplied to the neutron recorder servo 27. Also, the monitor detector 108 in the subsurface instrument 2 is measuring the neutron output of the source 18 and is supplying a signal which is transmitted up the cable 4 to the monitor discriminator 110 in the surface unit 28. This signal is passed through contact 112 of switch 114 to a counting rate meter 116 and is then supplied to the monitor recorder servo 102 and the control servo 104. Switches 113 and 114 are controlled by relay 62. Accordingly, when comparator circuit 60 is triggered to actuate relay 62 and supply the first carrier signal to the subsurface instrument 2 to de-energize the source 18, the relay 62 also operates switches 113 and 114 to open contacts 111 and 112 and prevent further information from being supplied to the neutron recorder servo 27, monitor recorder servo 102 and control servo 104. At the same time, relay 62 also operates switches 117, 118 and 120 which close contacts 121, 122 and 124 respectively and allow a suitable bias voltage from bias supply 126 to be applied to the neutron recorder servo 27, monitor recorder servo 102 and control servo 104 to "freeze" the servo motors and, thus, hold them in position until the end of the cycle.

Similarly, as previously described, the activation detector 22 is disconnected from cable 4 at the beginning of the cycle and remains in this condition until comparator circuit 56 is triggered to energize relay 80 and pass the second carrier signal from carrier generator 86 down the cable 4 to actuate relay 96 which connects activation detector 22 to the cable 4. The activation detector 22 then sends out signals which are transmitted up the cable 4 to the surface unit 28 where they are applied to activation discriminator 128 and are passed through contact 130 of switch 132 to a counting rate meter 134 and thence to activation recorder servo 106. Switch 132 is controlled by relay 80 and holds contact 130 open at the start of the cycle. When comparator circuit 56 is triggered, it actuates relay 80 which allows the second carrier to be transmitted to connect the activation detector 22 to the cable 4 and, at the same time, operates switch 132 to close contact 130. As described above for the monitor recorder servo 102, means must be provided for the activation recorder servo 106 to hold the pen fixed during those portions of the cycle when the activation detector 22 is disconnected. To accomplish this, bias voltage from bias supply 126 is applied to activation recorder servo 106 through contact 136 of switch 138. Switch 138 is controlled by relay 80 and holds contact 136 closed at the beginning of the cycle. This allows bias voltage from bias supply 126 to be applied to activation recorder servo 106 to freeze the servo motor and hold the pen fixed. When relay 80 is actuated to connect the activation detector 22 to the cable 4, it also operates switch 138 to open contact 136 thereby freeing the recorder pen to record the activation information.

In the foregoing description, the invention has been described relative to a well logging system including a Van de Graaff generator in the neutron source. However, it should be apparent that the invention is equally useful with substantially any accelerator type neutron source. Moreover, numerous other variations and modifications may obviously be made without departing from the invention. Accordingly, it should be clearly understood that the form of the invention described above and shown in the accompanying drawings is illustrative only and is not intended to limit the scope of the invention.

We claim:

1. Apparatus for cyclic activation logging comprising a subsurface instrument; a surface unit; and a cable for suspending said subsurface instrument in a borehole to be logged and providing electrical connection between said instrument and said surface unit; said instrument including an accelerator type radiation source, a plurality of radiation detectors, means responsive to a signal from said surface unit to periodically de-energize said source, means responsive to signals from said surface unit to connect the outputs of said radiation detectors to said cable and to disconnect the outputs of said radiation detectors from said cable in a predetermined time sequence related to the cycle of energization of said source; said surface unit including means generating said signals, and means for applying said signals to said cable in a predetermined time sequence.

2. The apparatus of claim 1 wherein said surface unit also includes a plurality of recorder means for respectively integrating and recording the outputs of said radiation detectors, and means responsive to said signals for connecting said recorder means to said cable and disconnecting said recorder means from said cable in a predetermined time sequence related to the cycle of energization of said source.

3. The apparatus of claim 2 wherein said surface unit also includes means for holding each of said recorder means at the level of the last received integrated detector signal during periods when said recorder means are disconnected from said cable.

4. Apparatus for cyclic activation logging comprising a subsurface instrument; a surface unit; and a cable for suspending said subsurface instrument in a borehole to be logged and providing electrical connection between said instrument and said surface unit; said instrument including an accelerator type neutron source, a monitor detector, a neutron detector, an activation detector, means responsive to a first signal for de-energizing said neutron source, means responsive to a second signal to disconnect the output of said neutron detector from said cable and to connect the output of said activation detector to said cable, means responsive to cessation of said second signal to re-energize said source, and means responsive to cessation of said second signal to disconnect the output of said activation detector from said cable and to connect the output of said neutron detector to said cable; said surface unit including means generating said first signal, means generating said second signal, and means for connecting the outputs of said signal generating means to said cable and disconnecting the outputs of said signal generating means from said cable in a predetermined time sequence.

5. Apparatus for cyclic activation logging comprising a subsurface instrument; a surface unit; and a cable for suspending said subsurface instrument in a borehole to be logged and providing electrical connection between said instrument and said surface unit; said instrument including an accelerator type neutron source, a monitor detector, a neutron detector, an activation detector, means responsive to a first signal for de-energizing said neutron source, means responsive to a second signal to disconnect the output of said neutron detector from said cable and to connect the output of said activation detector to said cable, means responsive to cessation of said second signal to re-energize said source, and means responsive to cessation of said second signal to disconnect the output of said activation detector from said cable and to connect the output of said neutron detector to said cable; said surface unit including means generating said first signal, means generating said second signal, means for connecting the outputs of said signal generating means to said cable and disconnecting the outputs of said signal generating means from said cable in a predetermined time sequence, first recorder means for recording the output of said monitor detector, second recorder means for recording the output of said neutron detector, third recorder means for recording the output of said activation detector, synchronous means responsive to said first signal to disconnect said first and second recorder means from said cable, and synchronous means responsive to said second signal to connect said third recorder means to said cable.

6. Apparatus for cyclic activation logging comprising a subsurface instrument; a surface unit; and a cable for suspending said subsurface instrument in a borehole to be logged and providing electrical connection between said instrument and said surface unit; said instrument including an accelerator type neutron source, a monitor detector, a neutron detector, an activation detector, means responsive to a first signal for de-energizing said neutron source, means responsive to a second signal to disconnect the output of said neutron detector from said cable and to connect the output of said activation detector to said cable, means responsive to cessation of said second signal to re-energize said source, and means responsive to cessation of said second signal to disconnect the output of said activation detector from said cable and to connect the output of said neutron detector to said cable; said surface unit including means generating said first signal, means generating said second signal, means for connecting the outputs of said signal generating means to said cable and disconnecting the outputs of said signal generating means from said cable in a predetermined time sequence, first recorder means for recording the output of said monitor detector, second recorder means for recording the output of said neutron detector, third recorder means for recording the output of said activation detector, synchronous means responsive to said first signal to disconnect said first and second recorder means from said cable, synchronous means responsive to said second signal to connect said third recorder means to said cable, means responsive to cessation of said second signal to connect said first and second recorder means to said cable and to disconnect said third recorder means from said cable, and means for holding said recorder means at the position indicating the last received detector signal during periods when said recorder means are disconnected from said cable.

7. In a system for cyclic logging having a subsurface instrument, a surface unit, and a cable for suspending said subsurface instrument in a borehole to be logged and providing electrical connection between said instrument and said surface unit, apparatus comprising means in said surface unit generating signals, means for periodically applying said signals to conductors of said cable, a neutron source, a radiation detector, means responsive to said periodically applied signals from said surface unit to cause said neutron source to operate periodically, means to connect the output of said radiation detector to said conductors, and means in said subsurface instrument for selectively utilizing the output of said radiation detector only during the period said signals are not being applied to said conductors.

8. Apparatus for cyclic logging comprising a subsurface instrument; a surface unit; and a cable for suspending said subsurface instrument in a borehole to be logged and providing electrical connection between said instrument and said surface unit; said instrument including a normally operating neutron source, a detector monitoring said neutron source, means responsive to periodically interrupted carrier signals transmitted from said surface unit over conductors of said cable to cause said neutron source to cease operating while said carrier signals are being received, and means to connect the output of said monitoring detector to conductors of said cable; said surface unit including means generating carrier signals, means for periodically applying said signals to said conductors, and means for selectively utilizing signals from said detector only during the period said carrier signals are interrupted.

9. Apparatus for cyclic activation logging comprising a subsurface instrument; a surface unit; and a cable for suspending said subsurface instrument in a borehole to be logged and providing electrical connection between said instrument and said surface unit; said instrument including a normally operating neutron source, an activation detector, a detector monitoring said neutron source, means responsive to periodically applied first carrier signals transmitted from said surface unit over said cable to cause said neutron source to cease operating while said first carrier signals are being received, means responsive to periodically applied second carrier signals transmitted from said surface unit over said cable to maintain said source inoperative and selectively to connect said activation detector to said cable while said second carrier signals are being received, and means to connect the output of said monitoring detector to said cable; said surface unit including means generating said first and second carrier signals, means for periodically applying said first and second signals to said conductors in sequence with said second signals being applied at the time said first signals are removed, and means for selectively utilizing signals from said monitoring detector only during the period both said first and second carrier signals are interrupted.

References Cited in the file of this patent

UNITED STATES PATENTS

| | | |
|---|---|---|
| 2,303,688 | Fearon | Dec. 1, 1942 |
| 2,842,695 | Goodman | July 8, 1958 |
| 2,867,728 | Pollock | Jan. 6, 1958 |
| 2,911,536 | Scherbatskoy | Nov. 3, 1959 |
| 2,991,364 | Goodman | July 4, 1961 |

FOREIGN PATENTS

| | | |
|---|---|---|
| 724,441 | Great Britain | Feb. 23, 1955 |
| 784,641 | Great Britain | Oct. 16, 1957 |

OTHER REFERENCES

LAMS 2215, Pulsed Neutron Techniques, by Keepin, April 29, 1958.